United States Patent
McCallum et al.

(10) Patent No.: US 8,837,734 B2
(45) Date of Patent: Sep. 16, 2014

(54) MANAGING ENCRYPTED DATA AND ENCRYPTION KEYS

(75) Inventors: Nathaniel McCallum, Nicholasville, KY (US); Adam Young, Arlington, MA (US); Miloslav Trmac, Brno (CZ); Ade Lee, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/618,289

(22) Filed: Sep. 14, 2012

(65) Prior Publication Data

US 2014/0079221 A1 Mar. 20, 2014

(51) Int. Cl.
*H04L 9/00* (2006.01)
(52) U.S. Cl.
USPC .............. 380/277; 713/189; 713/193; 726/3; 726/7; 726/2; 711/156; 711/170
(58) Field of Classification Search
CPC ....... G06F 21/6218; G06F 21/00; H04L 9/32; H04L 9/08
USPC .............. 380/277; 713/189, 193; 726/3, 7, 2; 711/156, 170
See application file for complete search history.

(56) References Cited

U.S. PATENT DOCUMENTS

| | | | |
|---|---|---|---|
| 2008/0016148 A1* | 1/2008 | Lora et al. ...................... | 709/203 |
| 2008/0181406 A1* | 7/2008 | Iyer et al. ...................... | 380/277 |
| 2010/0250959 A1* | 9/2010 | Challener et al. .............. | 713/189 |
| 2011/0191599 A1* | 8/2011 | Chou et al. .................... | 713/193 |
| 2011/0252242 A1* | 10/2011 | Ureche et al. ................. | 713/189 |
| 2013/0159699 A1* | 6/2013 | Torkkel ......................... | 713/155 |

* cited by examiner

*Primary Examiner* — Brian Shaw
(74) *Attorney, Agent, or Firm* — Lowenstein Sandler LLP (57) ABSTRACT

A data module encrypts a first portion of a drive in a data center using a first encryption key. The data module encrypts the first encryption key using a second encryption key to obtain an encrypted encryption key. The data module stores the second encryption key in a first location and stores the encrypted encryption key in a second location that is separate from the first location and that is inaccessible from outside the data center.

17 Claims, 5 Drawing Sheets

MANAGING ENCRYPTED DATA AND ENCRYPTION KEYS

TECHNICAL FIELD

Embodiments of the present invention relate to data encryption, and more specifically, to managing encrypted data and managing encryption keys.

BACKGROUND

A data center may be a facility used to house electronic equipment (e.g., general computing systems or server computing systems) and associated components, such as telecommunication components (e.g., routers, switches, etc.) and storage systems (e.g., hard drives, storage area networks (SANs), etc.). The data center may provide the clients (e.g., a laptop computer, a smart phone, etc.) access to data that is stored within the data center. For example, the data center may allow a client to access and/or update (e.g., change or manipulate) data stored within storage components of the data center (e.g., within a hard drive or a server computer). The data center may also provide access to operations, services, and/or applications to the clients. For example, the client may access an application that is stored and/or executing on a server computer within the data center. The data center may also allow clients to write data to the data center. For example, the data center may allow the user to store a new file or to update an existing file stored within a drive in the data center.

Many entities, such as individual users/people, companies, corporations, etc., use data centers to store data, services, operations, and/or applications used by client devices. The data, services, operations, and/or applications are often stored on drives (e.g., hard disk drives, flash drives, etc.) within the data centers. The data, services, operations, and/or applications stored in the data centers may be confidential (e.g., an entity may not want people outside of the entity or other unauthorized people to have access to the drives and/or data stored in the data center). The drives of the equipment in the data center (e.g., servers) may periodically fail and/or require maintenance. Thus the drives may be sent to a repair center or a maintenance provider. The drives are often wiped (e.g., the data within the drives is deleted) in order to prevent unauthorized access to the data, services, operations, and/or applications stored on the drives.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for managing encrypted data and encryption keys are described. The encrypted data may be stored on a drive in a server (e.g., server computer) within a data center. The data center may provide computing devices (e.g., client devices or user devices such as laptop computers, smart phones, etc.) outside of the data center with access to the encrypted data stored on the drive. The data center may also provide access to the drives (e.g., write access to the drives or read access to encrypted portions of drives) within computing devices (e.g., servers) in the data center. A data encryption key (DEK) may be used to encrypt the data stored on the drive. The DEK may be encrypted using a key encryption key (KEK) to obtain an encrypted DEK (E-DEK) and the DEK may be deleted from the servers after obtaining the E-DEK. The KEK may be stored in a secure memory of the server or in an unencrypted portion of the drive. The E-DEK may be stored in a separate server and/or storage device. The separate server and/or storage device may not be accessible from outside the data center.

Because both the E-DEK and the KEK are used to obtain the DEK (which can be used to decrypt data stored on a drive), storing the E-DEK in a location that is inaccessible outside of the data center prevents the encrypted data or encrypted portions on a drive from being decrypted when the drive is removed from the data center (e.g., the E-DEK or KEK is not accessible from outside the data center so data cannot be decrypted). This allows a drive to be removed from the data center and sent out for repair or maintenance without requiring data center administrators to delete or wipe the data on the drive, in order to prevent unauthorized access to the encrypted data or to encrypted portions of drives in the data center.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
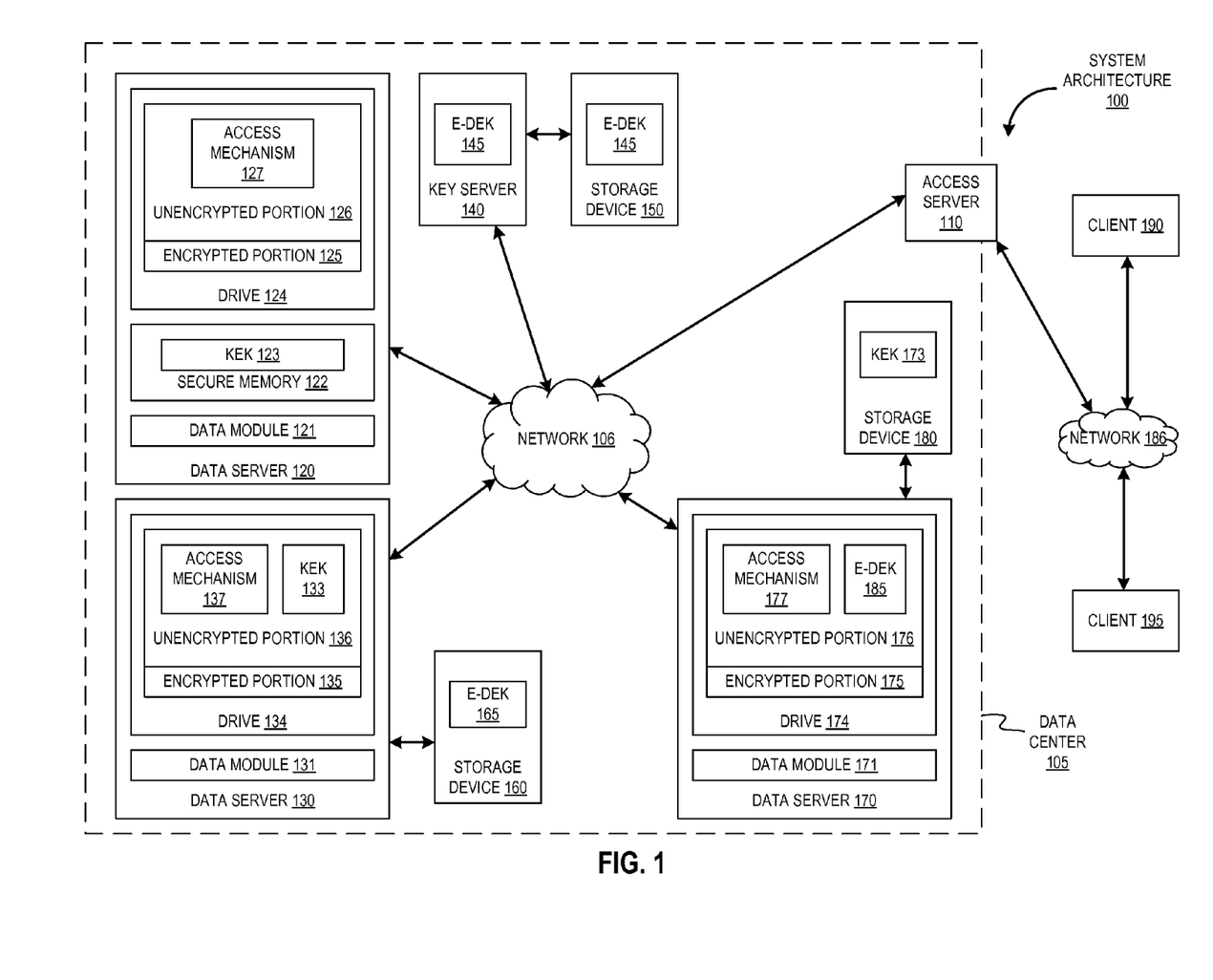
FIG. 1 is a block diagram of an exemplary system architecture, in accordance with one embodiment of the present disclosure.

FIG. 1 illustrates an exemplary system architecture 100, in accordance with one embodiment of the present disclosure. The system architecture 100 includes a data center 105, a network 186, and clients 190 and 195. The network 186 may be a private network (e.g., a local area network (LAN), a wide area network (WAN), intranet, etc.), a corporate network (e.g., a private network for an organization such as a corporation), and/or a public network (e.g., the Internet). The clients 190 and 195 may be personal computers (PC), personal digital assistants (PDAs), a smart phones, laptop computers, tablet computers, netbooks, cellular phones, general computing devices, and/or any machine capable of executing a set of instructions (sequential or otherwise) that specify actions to be taken by that machine.

In one embodiment, the data center 105 may be a facility used to house electronic equipment (e.g., server computing systems) and associated components, such as telecommunication components (e.g., routers, switches, etc.) and storage systems (e.g., hard drives, storage area networks (SANs), etc.). The data center 105 may provide the clients 190 and 195 access to encrypted portions of drives, data, operations, services, and/or applications that are stored within the data center 105 via the network 186. In one embodiment, the equipment and/or components of the data center 105 (e.g., the server computers, hard drives, switches, routers, etc.) may be located in different geographical locations. For example, the data center 105 may include a first server computer in one city/state/country and a second server computer in a second city/state/country. In another embodiment, the equipment and/or components of the data center 105 (e.g., the server computers, hard drives, switches, routers, etc.) may be located in the same geographical region. For example, the servers in a data center may be located in the same city, building, facility, etc. In a further embodiment, the data center 105 may be a logical grouping of electronic equipment and associated components.

The data center 105 includes data servers 120, 130 and 170, a network 106, a key server 140, and storage devices 150, 160, and 180. The data servers 120, 130, and 170, the access server 110, and the key server 140 are coupled to the network 106. The network 106 may be a private network (e.g., a local area network (LAN), a wide area network (WAN), intranet, etc.), a corporate network (e.g., a private network for an organization such as a corporation), and/or a public network (e.g., the Internet). Each of the data servers 120, 130, and 170, the key server 140, and the access server 110, may be a rackmount server, a router computer, a server computer, a personal computer, a portable digital assistant, a mobile phone, a laptop computer, a tablet computer, a desktop computer, a media center, a computing device, or any combination of the above.

The access server 110 may provide access to the servers (e.g., data server 110) and/or other resources within the data center. In another embodiment, the access server 110 may server as a firewall between the data center 105 and computing devices and/or networks that are outside of the data center 105 (e.g., that are not part of the data center 105). For example, the access server 110 may filter out certain types of data, packets, and/or messages that are transmitted to the data center 105 and may prevent these types of data, packets and/or messages from being transmitted to servers within the data center 105. In another example, the access server 110 may prevent certain types of data, packets, and/or messages from being transmitted to computing devices and/or networks that are outside of the data center 105. In another embodiment, the access server 110 may perform the functions of a proxy server. For example, the access server may be an intermediary that receives requests from clients 190 and 195 to access encrypted portions of drives, data, applications, and/or services stored on the data servers 120 and 130. The access server 110 may authenticate the clients 190 and 195 and may provide the requests to the data servers 120, 130, and 170. The access server 110 may also send data and/or other information from the data servers 120, 130, and 170 to the clients 190 and 195.

The data servers 120, 130, and 170 may provide data, applications, operations and/or services to client devices (e.g., clients 190 and 195). For example, the data server 120 may provide data (e.g., email messages, account information, banking data, etc.) to a client 190. In another example, the data server 130 may provide an application that performs a function requested by the client 195. The data, applications, operations, and/or services provided by the data server 120 maybe stored on drive 124 and the data, applications, operations, and/or services provided by the data server 130 maybe stored on drive 134. The drives 124, 134, and 174 may also store files, emails, and/or data (e.g., sensitive information) that should be protected by the data center 105. The drives 124, 134, and 174 may be mass storage devices (e.g., hard disks, flash hard drives, etc.). In one embodiment, the data servers 120 and 130 may include multiple drives and each drive may include multiple portions, partitions and/or volumes.

Data server 120 includes a data module 121, a secure memory 122, and a drive 124. The drive 124 includes an encrypted portion 125 (e.g., a portion that has been encrypted using an encryption algorithm and/or operation) and an unencrypted portion 126. In one embodiment, the unencrypted portion 126 may be boot partition or boot section of the drive 124. For example, the unencrypted portion 126 may be used by the data server 120 when the data server 120 boots up (e.g., when the data server 120 turns on or restarts). The data module 121 may manage the data/applications stored in the drive 124 and/or may manage access to the drive 124. For example, the data module 121 may retrieve data requested by the client 190, from the encrypted portion 125 of the drive 124. In another example, the data module 121 may access an application that is stored in the encrypted portion 125 of the drive 124. In a further example, the data module 121 may allow a user to write data to the encrypted portion 125 or to write the data as a new encrypted portion (not shown in the figures). In one embodiment, the unencrypted portion 126 may be located in another drive (not shown in the figures) in the data server 120. For example, the unencrypted portion 126 may be an unencrypted portion of a second drive in the data server 120.

In one embodiment, the data module 121 may create the encrypted portion 125 of the drive 124. In another embodiment, the encrypted portion 125 of the drive 124 may have been previously created by a drive management application/tool or a logical volume manager (LVM) application/tool. For example, the drive 124 may be formatted and/or partitioned using an LVM application on a different computer or server. The drive 124 may be installed or placed in the data server 120 after the drive 124 is formatted and/or partitioned. The encrypted portion 125 may be encrypted using a data encryption key (DEK). A DEK may generally refer to a piece of information (e.g., an encryption key, a hash, a parameter) that determines the functional output of an encryption algorithm or cipher and/or is used to encrypt data. The DEK may be a first key used by the system architecture 100 to encrypt data on the encrypted portion 125. In one embodiment, the encrypted portion 125 may be a partition of the drive 124. In another embodiment, the encrypted portion 125 may be a portion of a partition of the drive 124. In a further embodiment, the encrypted portion 125 may include multiple partitions of the drive 124. In yet another embodiment, the encrypted portion 125 may span (e.g., may be stored on or spread across) multiple drives (not shown in the figures). The multiples drives may be located in the data server 120 or may be located within multiple computing devices (e.g., each of the multiple drives is located on a different server). In one embodiment, the encrypted portion 125 may be one or more encrypted files and/or encrypted data objects (e.g., encrypted data structures, such as tables, lists, etc., or other encrypted information). The DEK used to encrypt the encrypted portion 125 of the drive 124 may be encrypted in order to further secure the data stored in the encrypted portion 125 from unauthorized access. The DEK may be encrypted (e.g., wrapped) using a key encryption key (KEK) 123 to generate or obtain an encrypted DEK (E-DEK) 145. A KEK may generally refer to any information (e.g., an encryption key, a hash, a parameter, etc.) that is used to encrypt another key (e.g., the DEK).

In one embodiment, the data module 121 generates, obtains, and/or manages the different keys (e.g., the DEK, the KEK 123, the E-DEK 145). For example, the data module 121 may use a random number generator to generate the different keys (e.g., the E-DEKs, the DEKs, the KEKs, etc.) In another example, the data module 121 may retrieve, access, and/or use keys that are generated by another computing device (e.g., another server computer). The data module 121 may generate and/or obtain the DEK used to encrypt the encrypted portion 125 of the drive 124. The data module 121 may also generate and/or obtain the KEK 123 that is used to encrypt the DEK. The data module 121 may further encrypt the DEK using the KEK 123 to obtain the E-DEK 145. In one embodiment, the data module 121 may store the KEK 123 in a secure memory 122. The secure memory may be a secure or protected memory or cache within the data server 120 that prevents unauthorized access. For example, the secure memory 122 may be a secure cache on a motherboard of the data server 120.

In one embodiment, the data module 121 may store the E-DEK 145 on the key server 140. The key server 140 may be a server that is only accessible within the data center 105. For example, the key server 140 may not be accessible by the client 190 because the access server 110 (that manages external or outside access to the data center) may prevent requests and/or messages from outside the data center 105, from reaching the key server 140. In another example, the key server 140 may not be communicatively coupled (e.g., may not be connected) to networks and/or devices outside of the data center 105. In another embodiment, the data module 121 and/or the key server 140 may store the E-DEK 145 on a storage device 150 that is coupled to the key server 140. For example, the E-DEK 145 may be stored on a universal serial bus (USB) flash drive that is connected to the key server 140. The storage device 150 may be any device that is capable of storing data (e.g., an external hard drive, a flash drive, a memory card, a smart card, a removable storage device, etc.). If the E-DEK 145 is stored on the storage device 150, the key server 140 will access the storage device 150 when the key server 140-receives a request for the E-DEK 145. In another embodiment, after generating the E-DEK 145, the data module 121 may delete, remove, and/or discard the DEK (e.g., delete the DEK from any local memories, caches, drives and/or storage devices).

The access mechanism 127 may provide access to the E-DEK 145 that is stored on the key server 140 or on the storage device 150. The data module 121 may use the access mechanism 127 to obtain the E-DEK 145. In one embodiment, the access mechanism 127 may be a set of instructions for accessing the key server 140 or for requesting that the key server 140 obtain the E-DEK 145 from the storage device 150. For example, the access mechanism 127 may be a file (e.g., a text file, a hypertext markup language (HTML) file) that includes the internet protocol (IP) address or web address of the key server 140. The data module 121 may request the E-DEK 145 from the key server 140 by accessing the IP address. In another embodiment, the access mechanism 127 may be an application, a script, and/or a program that is stored on the unencrypted portion 126. The data module 121 may execute the application, script, and/or program (e.g., execute the access mechanism 127) and the application, script, and/or program may communicate with the key server 140 to retrieve the E-DEK 145 and provide the E-DEK 145 to the data module 121. In one embodiment, because the key server 140 is not accessible outside of the data center, the access mechanism 127 is not able to provide access to the key server 140 when the access mechanism 127 is used from outside the data center.

In one embodiment, the data module 121 may decrypt (e.g., unwrap) the E-DEK 145 to obtain the DEK, after the data module 121 receives the E-DEK 145 from the key server 140. The data module 121 may request and/or receive an access credential from a user or a client device and may verify or authenticate the access credential prior to obtaining the E-DEK 145 and decrypting the E-DEK 145. The data module 121 may use the KEK 123 (which was previously used to wrap or encrypt the DEK) to decrypt or unwrap the E-DEK 145 to obtain the DEK. After the data module 121 obtains the DEK, the data module 121 may decrypt the encrypted portion 125 using the DEK, in order to access data, programs, and/or services that are stored within the encrypted portion 125, or access the encrypted portion 125 itself (e.g., to write data to the encrypted portion 125). In one embodiment, the data module 121 may also use the DEK to encrypt data that a client device may want to write to the drive 124. For example, a client device may request to write a file to the drive 124 (e.g., a write request). The data module 121 may encrypt the file using the DEK and may write the encrypted file to the drive 124. The encrypted file may be a new encrypted portion (not shown in the figures) or may be included in the existing encrypted portion 125.

The data server 120 may store the E-DEK 145 and/or retrieve the E-DEK 145 from the key server 140 using various communication protocols. For example, the data server 120 may use the file transfer protocol (FTP) to store and/or retrieve the E-DEK from the key server 130. In another example, the data server 120 may use the hypertext transfer protocol to store and/or retrieve the E-DEK from the key server 130. The various communication protocols may include, but are not limited to FTP, HTTP, trivial FTP (TFTP), HTTP Secure (HTTPS), transmission control protocol/internet protocol (TCP/IP), user datagram protocol (UDP), etc.

In one embodiment, the drive 124 may include multiple encrypted portions and the multiple encrypted portions may be encrypted using multiple DEKs. The data module 121 may generate the multiple DEKs, may encrypt the multiple portions of the drive 124 using the multiple DEKs, may encrypt the multiple DEKs to obtain multiple E-DEKs, and may store the multiple E-DEKs on the key server 140. In one embodiment, the data module 121 may encrypt the multiple DEKs using the same KEK. In another embodiment, the data module 121 may encrypt the multiple DEKs using different KEKs.

In one embodiment, the data module 121 may generate and/or obtain an identifier for each of the multiple E-DEKs and may associate the identifiers with the E-DEKs. The identifier may be used to determine which E-DEK should be used to obtain the correct DEK to decrypt a particular encrypted portion. For example, if there are two encrypted portions, the data module 121 may use two different DEKs to encrypt the two encrypted portions and may generate two different E-DEKs using the two different DEKs. The data module 121 may generate and/or obtain two identifiers, one for the first E-DEK and one for the second E-DEK, so that when a request to access one of the encrypted portions is received, the data module 121 can obtain the correct E-DEK for the encrypted portion. The identifiers may be stored on the key servers 140 and/or the storage devices 150 and 160. In one embodiment, the identifiers may be any number, string, text and/or value. For example, the identifiers may be random numbers of random alpha-numeric strings. In another example, the identifiers may be universally unique identifiers (UUIDs) associated with a volume and/or partition of the drive 124. Other examples of identifiers may be computer/host names, IP addresses, medium access control (MAC) addresses, etc.

In one embodiment, if different KEKs are used to obtain the different E-DEKs (e.g., different KEKs are used to encrypt the different DEKs), the data module 121 may also associate the identifier for an E-DEK, with the KEK used to obtain the E-DEK. For example, if two different DEKs are used to encrypt two different portions of the drive 124, the data module 121 may encrypt the two DEKs using two KEKs, and may associate a first identifier (e.g., a hash, string, UUID, etc.) with the first E-DEK and the first KEK, and may associate a second identifier (e.g., a hash, string, UUID, etc.) with the second DEK and the second KEK.

In one embodiment, the data module 121 may be part of a logical volume manager (LVM) for the data server 120. For example, the data module 121 may be part of an application or utility that manages partitions and/or volumes of drives that are in the data server 120. In another embodiment, the data module 121 may be part of an operating system (OS) for the data server 120.

Data server 130 includes a data module 131 and drive 134. The drive 134 includes an encrypted portion 135 and an unencrypted portion 136. In one embodiment, the unencrypted portion 136 may be boot partition or boot section of the drive 134. The data module 131 may manage the data/applications stored in the drive 134 and/or may manage access to the drive 134.

In one embodiment, the data module 131 may create the encrypted portion 135 of the drive 134. In another embodiment, the encrypted portion 135 of the drive 134 may have been previously created by a drive management application/tool or a logical volume manager (LVM) application/tool. For example, the drive 134 may be formatted and/or partitioned using an LVM application on a different computer or server. The drive 134 may be installed or placed in the data server 130 after the drive 134 is formatted and/or partitioned. The encrypted portion 135 may be encrypted using a DEK. In one embodiment, the encrypted portion 135 may be a partition of the drive 134, a portion of the partition of the drive 134 and/or multiple partitions of the drive 134. In another embodiment, the encrypted portion 135 may span (e.g., may be stored on or spread across) multiple drives (not shown in the figures). The multiples drives may be located in the data server 130 or may be located within multiple computing devices (e.g., each of the multiple drives is located on a different server). In one embodiment, the encrypted portion 135 may be one or more encrypted files and/or encrypted data objects (e.g., encrypted data structures, such as tables, lists, etc., or other encrypted information). The DEK may be encrypted (e.g., wrapped) using a KEK 133 (e.g., an encryption key) to generate or obtain the E-DEK 165.

In one embodiment, the data module 131 generates, obtains, and/or manages the different keys (e.g., the DEK, the KEK 133, and the E-DEK 165). The data module 131 may store the KEK 133 in the unencrypted portion 136 of the drive 134. The data module 131 may also store the E-DEK 165 a storage device 160 that is coupled to the data server 130. The storage device 160 may be any device that is capable of storing data (e.g., an external hard drive, a flash drive, a memory card, a smart card, a removable storage device, etc.). In another embodiment, after generating the E-DEK 165, the data module 131 may delete, remove, and/or discard the DEK (e.g., delete the DEK from any local memories, caches, drives and/or storage devices). In one embodiment, the unencrypted portion 136 may be located in another drive (not shown in the figures) in the data server 130. For example, the unencrypted portion 136 may be an unencrypted portion of a second drive in the data server 130.

The access mechanism 137 may provide access to the E-DEK 165 that is stored on the storage device 150. The data module 131 may use the access mechanism 137 to obtain the E-DEK 165. In one embodiment, the access mechanism 137 may be a set of instructions for accessing from the storage device 160. For example, the access mechanism 137 may be a file (e.g., a text file) containing instructions (e.g., machine instructions or human-readable instructions) indicating that the E-DEK 165 is stored in a USB drive (e.g., storage device 160) coupled to the data server 130. In another embodiment, the access mechanism 137 may be an application, a script, and/or a program that is stored on the unencrypted portion 136. The data module 131 may execute the application, script, and/or program (e.g., execute the access mechanism 137) and the application, script, and/or program may communicate with the storage device 160 to retrieve the E-DEK 165 and provide the E-DEK 165 to the data module 131. In one embodiment, because the storage device 160 is not accessible outside of the data center, the access mechanism 137 is not able to provide access to the storage device 160 when the access mechanism 137 is used from outside the data center.

In one embodiment, the data module 131 may decrypt (e.g., unwrap) the E-DEK 165 to obtain the DEK that was previously encrypted, after the data module 131 receives the E-DEK 165 from the storage device 160. The data module 131 may request and/or receive an access credential from a user or a client device and may verify or authenticate the access credential prior to obtaining the E-DEK 165 and decrypting the E-DEK. The data module 131 may use the KEK 133 (which was previously used to wrap or encrypt the DEK) to decrypt or unwrap the E-DEK 165 to obtain the DEK. After the data module 131 obtains the DEK, the data module 131 may decrypt the encrypted portion 135 using the DEK, in order to access data, programs, and/or services that are stored within the encrypted portion 135, or to access the encrypted portion 135 itself (e.g., to write data, such as new file, to the encrypted portion 135). In one embodiment, the data module 131 may also use the DEK to encrypt data that a client device may want to write to the drive 134.

In one embodiment, the drive 134 may include multiple encrypted portions and the multiple encrypted portions may be encrypted using multiple DEKs. The data module 131 may generate the multiple DEKs, may encrypt the multiple portions of the drive 134 using the multiple DEKs, may encrypt the multiple DEKs to obtain multiple E-DEKs, and may store the multiple E-DEKs on the storage device 160. In another embodiment, the data module 131 may store one or more of the multiple E-DEKs on different storage devices. For example, if there are five E-DEKs, two may be stored on storage device 160, one may be stored on a second storage device, and the remaining two may be stored on a third storage device. In one embodiment, the data module 131 may encrypt the multiple DEKs using the same KEK. In another embodiment, the data module 131 may encrypt the multiple DEKs using different KEKs.

In one embodiment, the data module 131 may generate and/or obtain an identifier for each of the multiple E-DEKs and may associate the identifiers with the E-DEKs. The identifier may be used to determine which E-DEK is used to obtain the correct DEK to decrypt a particular encrypted portion. In one embodiment, the identifiers may be any number, string, text and/or value (e.g., a hash value, a UUID, IP address, host name, MAC address, etc.) In one embodiment, if different KEKs are used to obtain the different E-DEKs (e.g., different KEKs are used to encrypt the different DEKs), the data module 131 may also associate an identifier for an E-DEK, with the KEK used to obtain the E-DEK.

In one embodiment, the data module 131 may be part of a logical volume manager (LVM) for the data server 130. In another embodiment, the data module 131 may be part of an operating system (OS) for the data server 130.

Data server 170 includes a data module 171 and drive 174. The drive 174 includes an encrypted portion 175 and an unencrypted portion 176. In one embodiment, the unencrypted portion 176 may be boot partition or boot section of the drive 174. The data module 171 may manage the data/applications stored in the drive 174 and/or may manage access to the drive 174. In one embodiment, the data module 171 may create the encrypted portion 175 of the drive 174. In one embodiment, the data module 171 may be part of a logical volume manager (LVM) for the data server 170. In another embodiment, the data module 171 may be part of an operating system (OS) for the data server 170. In one embodiment, the encrypted portion 175 of the drive 174 may have been previously created by a drive management application/tool or a logical volume manager (LVM) application/tool. The encrypted portion 175 may be encrypted using a DEK. In one embodiment, the encrypted portion 175 may be a partition of the drive 174, a portion of the partition of the drive 174 and/or multiple partitions of the drive 174. In another embodiment, the encrypted portion 175 may span multiple drives (not shown in the figures). The multiples drives may be located in the data server 170 or may be located within multiple computing devices (e.g., each of the multiple drives is located on a different server). In one embodiment, the encrypted portion 175 may be one or more encrypted files and/or encrypted data objects (e.g., encrypted data structures, such as tables, lists, etc., or other encrypted information). The DEK may be encrypted (e.g., wrapped) using a KEK 173 (e.g., an encryption key) to generate or obtain the E-DEK 185.

In one embodiment, the data module 171 generates, obtains, and/or manages the different keys. Instead of storing E-DEKs on a storage device and KEKs in on the data server (as illustrated with data server 130), the data module 171 may store the E-DEK 185 in the unencrypted portion 176 of the drive 174 and may store the KEK 173 on a storage device 180 that is coupled to the data server 170. In another embodiment, after generating the E-DEK 185, the data module 171 may delete, remove, and/or discard the DEK. In one embodiment, the unencrypted portion 176 may be located in another drive (not shown in the figures) in the data server 170. The access mechanism 177 may provide access to the KEK 173 that is stored on the storage device 180. The data module 171 may use the access mechanism 177 to obtain the KEK 173. As discussed above, the access mechanism 177 may be a set of instructions, an application, a script, and/or a program that is stored on the unencrypted portion 176. The data module 171 may execute the application, script, and/or program and the application, script, and/or program may communicate with the storage device 180 to retrieve the KEK 173 and provide the KEK 173 to the data module 171. In one embodiment, because the storage device 180 is not accessible outside of the data center, the access mechanism 177 is not able to provide access to the storage device 180 when the access mechanism 177 is used from outside the data center.

In one embodiment, the data module 171 may decrypt the E-DEK 185 to obtain the DEK that was previously encrypted, after the data module 171 receives the KEK 173 from the storage device 180. The data module 171 may request and/or receive an access credential from a user or a client device and may verify or authenticate the access credential prior to obtaining the KEK 173 and decrypting the E-DEK. The data module 171 may use the KEK 173 to decrypt or unwrap the E-DEK 185 to obtain the DEK. After the data module 171 obtains the DEK, the data module 171 may decrypt the encrypted portion 175 using the DEK, in order to access data, programs, and/or services that are stored within the encrypted portion 175, or to access the encrypted portion 175 itself (e.g., to write or store a file in the encrypted portion 175). In one embodiment, the data module 171 may also use the DEK to encrypt data that a client device may want to write to the drive 174.

In one embodiment, the drive 174 may include multiple encrypted portions and the multiple encrypted portions may be encrypted using multiple DEKs. The data module 171 may generate the multiple DEKs, may encrypt the multiple portions of the drive 174 using the multiple DEKs, may encrypt the multiple DEKs using multiple KEKs to obtain multiple E-DEKs, and may store the multiple KEKs on the storage device 180. In one embodiment, the data module 171 may encrypt the multiple DEKs using the same KEK. In another embodiment, the data module 171 may encrypt the multiple DEKs using different KEKs. In a further embodiment, the data module 171 may store one or more of the multiple KEKs on different storage devices. In one embodiment, the data module 171 may generate and/or obtain an identifier for each of the multiple KEKs and may associate the identifiers with the KEKs. The identifier may be used to determine which KEK is used to obtain the correct DEK to decrypt a particular encrypted portion. In one embodiment, the identifiers may be any number, string, text and/or value. In one embodiment, if different KEKs are used to obtain the different E-DEKs, the data module 171 may also associate an identifier for a KEK, with the E-DEK generated using the KEK.

In different embodiments, the data modules 121, 131, and 171 may use any number or combination of different encryption algorithms, methods, and/or techniques for encrypting the encrypted portions 125, 135, and 175, and for encrypting the DEK (to obtain the E-DEKs 145 and 165). For example, the data modules 121, 131, and 171 may use one or more of the Rijndael algorithm, the Twofish algorithm, and/or the data encryption standard (DES) algorithm. Encryption algorithms, methods, and/or techniques include, but are not limited to, the Rijndael, the Twofish algorithm, the Blowfish algorithm, the RC4 algorithm, the RC2 algorithm, the DES algorithm, the Triple-DES algorithm, the advanced encrypted standard (AES) algorithm, etc. In one embodiment, the encryption algorithm used to encrypt the encrypted portions 125, 135, and 175 may be different from the encryption algorithm, used to encrypt the DEKs to obtain the E-DEKs 145, 165, and 185. For example, the encrypted portion 125 of drive 124 may be encrypted using the DES algorithm and the DEK may be encrypted using the Twofish algorithm. In another embodiment, the same encryption algorithm may be used to encrypt the encrypted portions 125, 135, and 175, and the DEKs.

In one embodiment, the KEKs 123, 133, and 173 may be a public key infrastructure (PKI) key pair. The PKI key pair may include the private key and a public key. The public key may be used to encrypt data (or another key). The encrypted data may not be decrypted using the public key. Instead, the private key may be used to decrypt the encrypted data. The private key is generally not derivable or is hard to derive from the public key. In one embodiment the data modules 121, 131 and 171 may generate and/or obtain the PKI key pair, encrypt DEKs using the public key in the PKI key pair, and discard, remove, and/or delete the public key after the DEKs are encrypted to obtain E-DEKs. The data modules 121, 131, and 171 may use the private key from the PKI key pair to decrypt the E-DEKs Although the data modules 121, 131, and 171 are shown within the data servers 120, 130, and 170, respectively, in other embodiments, the data modules 121, 131, and 171 or their components may be within other servers or device in the data center 105. For example, the data module 121 may reside within the key server 140 or within the access server 110.

Figure 2:
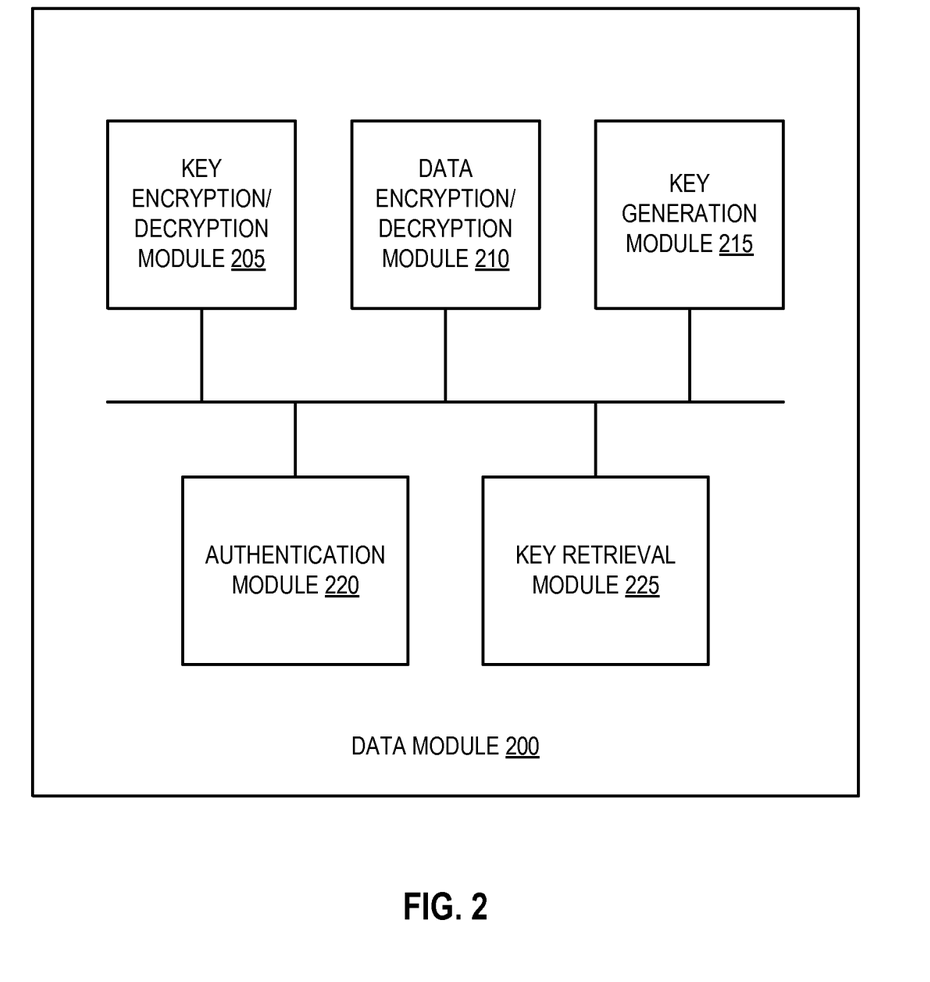
FIG. 2 is a block diagram illustrating a data module, in accordance with one embodiment.

FIG. 2 is a block diagram illustrating a data module 200, in accordance with one embodiment. The data module 200 may include a key encryption/decryption module 205, a data encryption/decryption module 210, a key generation module 215, an authentication module 220, and a key retrieval module 225. More or less components may be included in the data module 200 without loss of generality. In one embodiment, the key encryption/decryption module 205, the data encryption/decryption module 210, the key generation module 215, the authentication module 220, and the key retrieval module 225 may be divided into smaller components or modules. In another embodiment, the key encryption/decryption module 205, the data encryption/decryption module 210, the key generation module 215, the authentication module 220, and the key retrieval module 225 may be stored or located on different computing devices (e.g., each of the modules may be stored on different servers).

In one embodiment, the key generation module 215 may generate one or more keys that are used to encrypt data and/or other keys. For example, the key generation module 215 may generate a DEK that is used to encrypt a portion (e.g., a volume, a partition, a set of blocks) of a drive (e.g., a hard drive, a flash drive). In another example, the key generation module 215 may generate a KEK that is used to encrypt a DEK (e.g., to generate or obtain an E-DEK). The key generation module 215 may generate the one or more keys using a variety of different methods, algorithms and/or techniques. For example, the key generation module may use a random number generator to generate random numbers that are used to generate keys. In another example, the key generation module may use hashing algorithms to generate hashes that are used to generate keys. In another embodiment, the key generation module 215 may retrieve, downloaded, or otherwise access keys that were generated by another computing device (e.g., another server). For example, the key generation module 215 may access and/or download keys which are stored on another server within the data center.

In one embodiment, the data encryption/decryption module 210 may encrypt one or more portions (e.g., a volume, a partition, a part) of one or more drive (e.g., to prevent unauthorized action to data and/or applications stored on the drive). The data encryption/decryption module 210 may use the keys generated by the key generation module 215 to encrypt the portions of the one or more drives. For example, data encryption/decryption module 210 may use one or more encryption algorithms (e.g., AES) to encrypt a portion of the drive. The one or more encryption algorithms may use a key generated by the key generation module 215 to encrypt the portion of the drive. In another embodiment, the data encryption/decryption module 210 may also use keys (e.g., DEKs) generated by the key generation module 215 to decrypt the encrypted portions of one or more drives. For example, when the data module 200 receives a request to access an encrypted portion of the drive or to access data and/or an application on the encrypted portion of the drive, the data encryption/decryption module 210 may decrypt the encrypted portion of the drive to access the encrypted portion, data, and/or application. In one embodiment, the data encryption/decryption module 210 may be divided into two separate modules, a data encryption module (not shown in the figures) to encrypt the encrypted portions of one or more drives, and a data decryption module (not shown in the figures) to decrypt the encrypted portions of the one or more drives. The data encryption module and the data decryption module may be located on one computing device, or on different computing devices.

In one embodiment, the key encryption/decryption module 205 may encrypt the DEKs that are used to encrypt the encrypted portions of a drive. The key encryption/decryption module 205 may use keys generated by the key generation module 215 to encrypt the DEKs. For example, the key encryption/decryption module 205 may use one or more encryption algorithms (e.g., Twofish, DES, etc.) to encrypt a DEK to generate and/or obtain an E-DEK (e.g., an encrypted or wrapped DEK). The encryption algorithms may use a key generated by the key generation module 215 to encrypt the DEK. In another embodiment, the key encryption/decryption module 205 may decrypt the E-DEKs so that the encrypted portions of a drive may be decrypted. For example, when the data module 200 receives a request to access an encrypted portion of the drive, key encryption/decryption module 205 may decrypt an E-DEK to obtain the DEK that may be used to decrypt the encrypted portion of the drive. The key encryption/decryption module 205 may use one or more encryption algorithms to decrypt the E-DEK to obtain the DEK. The encryption algorithms may use a key generated by the key generation module 215 to decrypt the E-DEK. In one embodiment, the key encryption/decryption module 205 may be divided into two separate modules, a key encryption module (not shown in the figures) to encrypt the DEKs, and a key decryption module (not shown in the figures) to decrypt the E-DEKs. The key encryption module and the key decryption module may be located on one computing device, or on different computing devices.

In one embodiment, the key retrieval module 225 may obtain the KEKs that are used by the data module 200. For example, the key retrieval module 225 may obtain the KEK from an unencrypted portion of a drive. In another example, the key retrieval module may obtain the KEK from a secure memory (e.g., a secure cache on a motherboard) in a server. In another embodiment, the key retrieval module 225 may obtain the E-DEKs that are used by the data module 200. For example, the key retrieval module 225 may use an access mechanism (e.g., a script, a file with instructions, an application) stored on the drive to obtain the E-DEKs.

In one embodiment, the authentication module 220 may authenticate a user, an application, and/or a device (e.g., a client device) when the user, application, or device requests access to an encrypted portion of a drive or to data stored on the encrypted portion of the drive. For example, when a client device (e.g., a laptop computer, a smart phone) or a user requests access to an application and/or data stored on an encrypted portion of a drive within a data center, the authentication module 200 may request one or more access credentials (e.g., a username, password, one-time-password, biometric credential, etc.). The authentication module 220 may authenticate and/or verify the one or more access credentials before the data module 200 obtains an E-DEK associated with the encrypted portion, decrypts the E-DEK using a KEK to obtain a DEK, and decrypts the encrypted portion of the drive using the DEK. If the one or more access credentials are invalid (e.g., cannot be authenticated or are incorrect), the data module 200 may deny the request to access the application and/or data stored on the encrypted portion of the drive.

Figure 3:
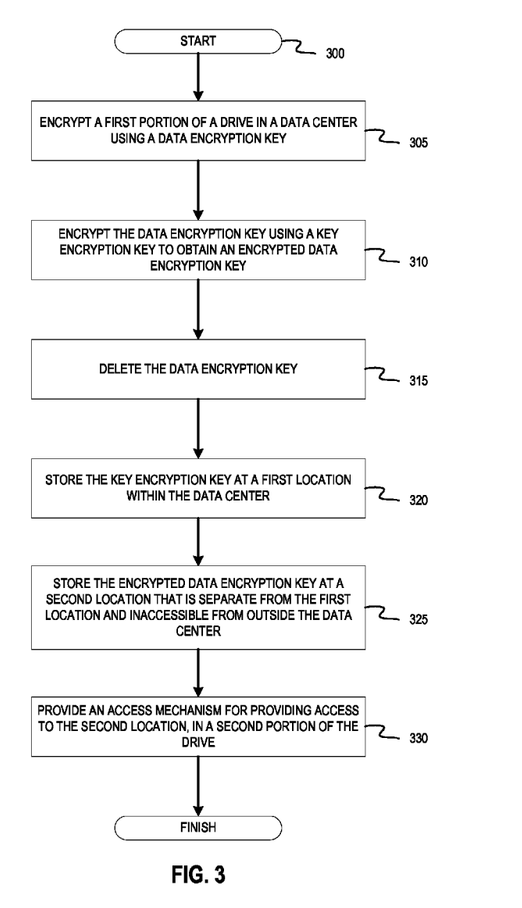
FIG. 3 is a flow diagram illustrating a method of setting up a drive in a data center, in accordance with one embodiment.
Figure 4:
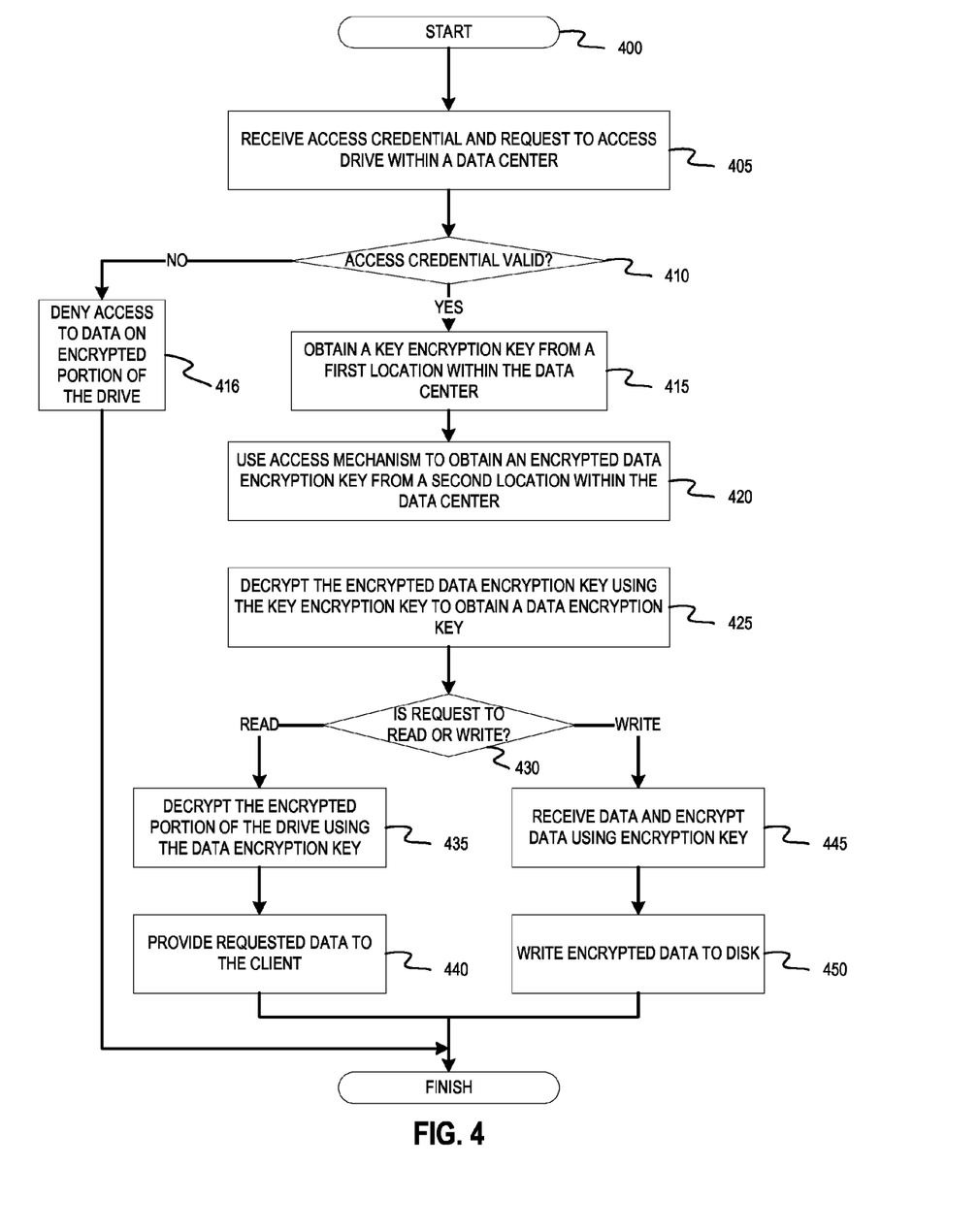
FIG. 4 is a flow diagram illustrating a method of accessing data in a data center, in accordance with one embodiment.

FIGS. 3 and 4 are flow diagrams illustrating methods for setting up a drive in a data center and accessing data in a data center. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one embodiment, the methods may be performed by a server machine (e.g., a server computer). Alternatively, the methods may be performed by a combination of a server machine and a client machine. For example, the operations of the methods may be divided between a client and server machine.

FIG. 3 is a flow diagram illustrating a method 300 of setting up a drive in a data center, in accordance with one embodiment. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a computing system or device (e.g., the servers 110, 120, 170, or 140 of FIG. 1). In one embodiment, the method 300 may be performed when a drive is added to a data center. The method 300 may initialize or setup the drive so that the drive can be used within the data-center.

Referring to FIG. 3, the method 300 starts with the computing system encrypting a first portion of a drive in a data center using a DEK (block 305). The computing system may generate the DEK used to encrypt the first portion of the drive. The computing system may also use a first encryption algorithm to encrypt the first portion of the drive. At block 310, the computing system encrypts (e.g., "wraps") the DEK using a KEK to obtain and/or generate an E-DEK. The computing system may generate the KEK used to encrypt the DEK. The computing system may use a second encryption algorithm (different than the first encryption algorithm) or may use the (same) first encryption algorithm to encrypt the DEK. At block 315, the computing system deletes the DEK used to encrypt the first portion of the drive. For example, the computing system may delete or remove the DEK from any memory (e.g., random access memory (RAM), drives, caches, and/or other storage devices). The computing system stores the KEK at a first location within the data center at block 320. In one embodiment, the first location may be an unencrypted portion of the drive. In another embodiment, the first location may be a secure memory (e.g., a secure cache on a motherboard) of computing device.

At block 325, the computing system stores the E-DEK at a second location that is separate from the first location. In one embodiment, the computing system may store the E-DEK on a separate server (e.g., a key server). In another embodiment, the computing system may store the E-DEK on a storage device that is coupled to the computing system (e.g., a smart card, a flash drive, etc.). The second location (e.g., the key server, the smart card) may be inaccessible from outside the data center (e.g., the second location is only accessible within the data center). For example, the second location may be inaccessible from outside the data center because the data center may have a server or firewall that prevent requests and/or messages from outside the data center from reaching the second location. In another example, the second location may not be communicatively coupled to networks and/or devices outside of the data center. At block 330, the computing system provides an access mechanism that may be used to provide access to the second location. The access mechanism may be located in the unencrypted portion (e.g., a second portion) of the drive. As discussed above, the access mechanism may be a file (that includes instructions for accessing the second location), an application, a program, and/or a script. After block 330, the method 300 ends.

FIG. 4 is a flow diagram illustrating a method of accessing data in a data center, in accordance with one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a computing system (e.g., the servers 110, 120, 170, or 140 of FIG. 1). In another embodiment, the method of 400 may be performed after the method 300 of FIG. 3 has been performed by the computing system. For example, the method 400 may decrypt data encrypted using the method 300 shown in FIG. 3. In another example, the method 400 may access an encrypted portion of the drive (e.g., to write data to the encrypted portion) that was encrypted using the method 300 shown in FIG. 3.

Referring to FIG. 4, the method 400 starts with the computing system receiving an access credential and a request to access a drive within a data center. (block 405). For example, the computing system may receive the request from a client device (e.g., a laptop computer, a tablet computer), that stores data in the data center. The request may be a request to access data stored on an encrypted portion of the drive (e.g., a read request) or a request to write data to the drive (e.g., a write request). The client device may also provide a username and password to the computing system. At block 410, the computing system determines whether the access credential is valid (e.g., authenticates the username and password). In one embodiment, the computing system may receive multiple access credentials (e.g., a username, a password, and an OTP). The computing system may validate the multiple user credentials at block 410. If the access credential is not valid, the computing system denies or prevents access to the encrypted portion of the drive and/or the data on the encrypted portion of the drive at block 416. If the access credential is valid, the computing system obtains a KEK from a first location (e.g., a secure memory on the computing system, an unencrypted portion of the drive, etc.) within the data center block 415).

At block 420, the computing system uses the access mechanism to obtain an E-DEK from a second location within the data center. For example, the computing system may execute an application (e.g., the access mechanism) and the application may obtain the E-DEK from a key server. In another example, the computing system may access a file (e.g., the access mechanism) to obtain instructions for obtaining the E-DEK (e.g., the file may include the IP address or URL of a key server that stores the E-DEK). The second location may be separate from the first location and may be inaccessible from outside the data center. In one embodiment, the computing system may obtain the KEK from the second location using the access mechanism and may obtain the E-DEK from the first location (as illustrated by data server 170 in FIG. 1). At block 425, the computing system decrypts the E-DEK using the KEK to obtain a DEK. The computing system determines whether the request received at block 405 is a request to read or access encrypted data stored in the encrypted portion of the drive, or a request to write data to the drive (block 430).

If the request is a request to read data (e.g., access data) stored in the encrypted portion of the drive (e.g., a read request), the computing system decrypts the encrypted portion of the drive to access the data using the DEK at block 435. At block 440, the computing system provides the decrypted data to the client device (e.g., transmits the data to the client device). In one embodiment, the computing system may decrypt the data temporarily in memory (e.g., in a random access memory) and may delete the decrypted data from the memory after providing the decrypted data to the client device. After block 440, the method ends. If the request is a request to write data (e.g., write one or more files and/or data objects) to the drive (e.g., a write request), the computing system receives the data (e.g., receives the data from the client device) and encrypts the data using the DEK at block 445. At block 450, the encrypted data is written to the disk. In one embodiment, the encrypted data may be a new encrypted portion on the drive. In another embodiment, the encrypted data may be included in an existing encrypted portion on the drive. After block 450, the method 400 ends.

In some embodiments, the blocks 405, 410, and 416 may be optional. For example, the computing system may not authenticate user credentials prior to granting access to the encrypted portion of the drive or data stored on the encrypted portion of the drive. In another embodiment, the computing system may perform blocks 420 through 450 multiple times. For example, each time a client device or a user accesses the encrypted portion of the drive or accesses data stored on the encrypted portion of the drive, the computing system may perform blocks 420 through 450. In one embodiment, the computing system may temporarily store (e.g., cache) the DEK in a secure memory or a secure location within the computing system. This may allow the computing system to avoid decrypting the E-DEK each time a client device or user accesses the encrypted portion of the drive. The computing system may temporarily store the DEK until the computing system is switched off or rebooted, or until a certain time period has passed (e.g., 2 hours, 1 day, etc.). Afterwards, the computing system may delete the DEK.

Figure 5:
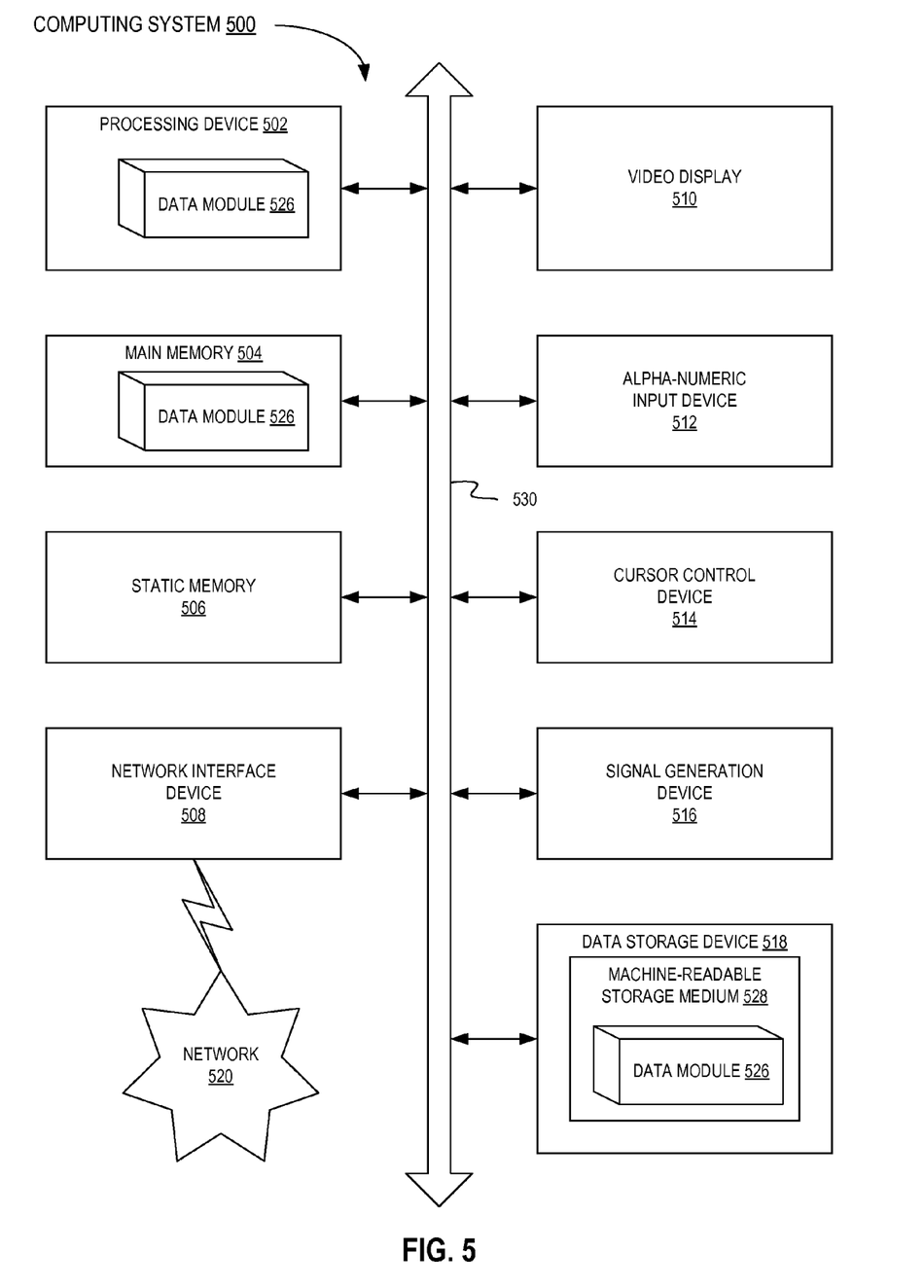
FIG. 5 illustrates a diagrammatic representation of a machine in the exemplary form of a computing system, in accordance with one embodiment.

FIG. 5 illustrates a diagrammatic representation of a machine in the exemplary form of a computing system 500 within which a set of instructions, for causing the machine to perform any one or more of the methodologies discussed herein, may be executed. The system 500 may be in the form of a computing system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the data module 526 for performing the operations and steps discussed herein.

The computing system 500 may further include a network interface device 508 which may communicate with a network 520. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and a signal generation device 516 (e.g., a speaker).

The data storage device 518 may include a computer-readable medium 528 on which is stored one or more sets of instructions (e.g., instructions of data module 526) embodying any one or more of the methodologies or functions described herein. The data module 526 may also reside, completely or at least partially, within the main memory 504 and/or within the processing device 502 during execution thereof by the computing system 500, the main memory 504 and the processing device 502 also constituting computer-readable media. The instructions may further be transmitted or received over a network 520 via the network interface device 508.

While the computer-readable storage medium 528 is shown in an exemplary embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    encrypting a first portion of a drive in a computing device in a data center, using a first encryption key;
    encrypting the first encryption key using a second encryption key to obtain an encrypted encryption key;
    responsive to obtaining the encrypted encryption key, deleting the first encryption key;
    responsive to deleting the first encryption key, storing the second encryption key in a first location within the data center;
    storing the encrypted encryption key in a second location within the data center, wherein access to the second location from outside the data center is selectively prevented by an access server and wherein the second location is separate from the first location; and
    providing, by a processing device, an access component located on a second portion of the drive, the access component providing access to the encrypted encryption key, wherein the second portion of the drive is unencrypted, and wherein the access component, via the access server, selectively prevents access to the encrypted encryption key from outside the data center when the drive is outside the data center and communicatively coupled to the data center; wherein the access component further provides access to the second encryption key when the second encryption key is not stored on the computing device.

2. The method of claim 1, further comprising:
    receiving a request to access the drive from a client device;
    obtaining the second encryption key from the first location;
    obtaining the encrypted encryption key from the second location;
    decrypting the encrypted encryption key to obtain the first encryption key;
    determining whether the request comprises a read request or a write request;
    when the request comprises the read request:
        decrypting the first portion of the drive using the first encryption key;
        accessing, in the first portion of the drive, a first data requested by the client device; and
        providing the first data to the client device; and
    when the request comprises the write request:
        encrypting a second data provided by the client device; and
        writing the encrypted second data to the drive.

3. The method of claim 2, further comprising:
    requesting an access credential;
    authenticating the access credential prior to obtaining the second encryption key from the first location.

4. The method of claim 1, wherein the second location comprises one or more of:
    a server within the data center; or
    a removable storage device coupled to the server within the data center.

5. The method of claim 1, wherein the first location is within the second portion of the drive.

6. The method of claim 1, wherein the first location comprises a secure memory within the computing device.

7. The method of claim 1, wherein the second encryption key comprises a public-private key pair.

8. The method of claim 1, wherein the access component comprises at least one of:
    a file that includes instructions for accessing the second location;
    an application; or
    a script.

9. An apparatus comprising:
    a memory to store one or more keys;
    a processing device, coupled to the memory, to:
        encrypt a first portion of a drive in a computing device in a data center, using a first encryption key;
        encrypt the first encryption key using a second encryption key to obtain an encrypted encryption key;
        responsive to obtaining the encrypted encryption key, deleting the first encryption key;
        responsive to deleting the first encryption key, store the second encryption key in a first location within the data center;

store the encrypted encryption key at a second location within the data center, wherein access to the second location from outside the data center is selectively prevented by an access server and wherein the second location is separate from the first location; and provide, by a processing device, an access component located on a second portion of the drive, the access component providing access to the encrypted encryption key, wherein the second portion of the drive is unencrypted, and wherein the access component, via the access server, selectively prevents access to the encrypted encryption key from outside the data center when the drive is outside the data center and communicatively coupled to the data center; wherein the access component further provides access to the second encryption key when the second encryption key is not stored on the computing device.

10. The apparatus of claim 9, wherein the processing device is further configured to:

receive a request to access the drive from a client device;
obtain the second encryption key from the first location;
obtain the encrypted encryption key from the second location;
decrypt the encrypted encryption key to obtain the first encryption key;
determine whether the request comprises a read request or a write request;
when the request comprises the read request:
  decrypt the first portion of the drive using the first encryption key;
  access, in the first portion of the drive, a first data requested by the client device; and
  provide the first data to the client device; and
when the request comprises the write request:
  encrypt a second data provided by the client device; and
  write the encrypted second data to the drive.

11. The apparatus of claim 10, wherein the processing device is further configured to:

request an access credential;
authenticate the access credential prior to obtaining the second encryption key from the first location.

12. The apparatus of claim 9, wherein the second location comprises at least one of:

a server within the data center; or
a removable storage device coupled to the server within the data center.

13. The apparatus of claim 9, wherein the first location is within the second portion of the drive.

14. The apparatus of claim 9, wherein the first location comprises a secure memory within the computing device.

15. The apparatus of claim 9, wherein the access component comprises at least one of:

a file that includes instructions for accessing the second location;
an application; or
a script.

16. A non-transitory computer readable storage medium having instructions that, when executed by a processing device, cause the processing device to perform operations comprising:

encrypting a first portion of a drive in a computing device in a data center, using a first encryption key;
encrypting the first encryption key using a second encryption key to obtain an encrypted encryption key;
responsive to obtaining the encrypted encryption key, deleting the first encryption key;
responsive to deleting the first encryption key, storing the second encryption key in a first location within the data center;
storing the encrypted encryption key in a second location within the data center, wherein access to the second location from outside the data center is selectively prevented by an access server and wherein the second location is separate from the first location; and
providing, by a processing device, an access component located on a second portion of the drive, the access component providing access to the encrypted encryption key, wherein the second portion of the drive is unencrypted, and wherein the access component, via the access server, selectively prevents access to the encrypted encryption key from outside the data center when the drive is outside the data center and communicatively coupled to the data center; wherein the access component further provides access to the second encryption key when the second encryption key is not stored on the computing device.

17. The non-transitory computer readable storage medium of claim 16, wherein the operations further comprise:

receiving a request to access the drive from a client device;
obtaining the encrypted encryption key from the first location;
obtaining the second encryption key from the second location;
decrypting the encrypted encryption key to obtain the first encryption key;
determining whether the request comprises a read request or a write request;
when the request comprises the read request:
  decrypting the first portion of the drive using the first encryption key;
  accessing, in the first portion of the drive, a first data requested by the client device; and
  providing the first data to the client device; and
when the request comprises the write request:
  encrypting a second data provided by the client device; and
  writing the encrypted second data to the drive.

* * * * *